United States Patent
Liang et al.

(10) Patent No.: US 7,326,325 B2
(45) Date of Patent: Feb. 5, 2008

(54) APPARATUS AND METHOD FOR CONNECTING WATER TREATMENT DEVICES

(75) Inventors: Li-Shiang Liang, Harvard, MA (US); Emile O. Montminy, Lowell, MA (US)

(73) Assignee: Siemens Water Technologies Holding Corp., Warrendale, PA (US)

( * ) Notice: Subject to any disclaimer, the term of this patent is extended or adjusted under 35 U.S.C. 154(b) by 0 days.

(21) Appl. No.: 10/943,782

(22) Filed: Sep. 17, 2004

(65) Prior Publication Data

US 2005/0087446 A1    Apr. 28, 2005

Related U.S. Application Data

(60) Provisional application No. 60/504,140, filed on Sep. 19, 2003.

(51) Int. Cl.
 *B01D 61/48* (2006.01)
(52) U.S. Cl. ............... 204/524; 204/533; 204/536; 204/632; 204/633
(58) Field of Classification Search ............... 204/632, 204/633, 524, 533, 536
See application file for complete search history.

(56) References Cited

U.S. PATENT DOCUMENTS

| 5,292,422 A | * | 3/1994 | Liang et al. ............... 204/632 |
| 5,925,240 A | * | 7/1999 | Wilkins et al. ............... 210/88 |
| 6,056,878 A | | 5/2000 | Tessier et al. |
| 6,193,869 B1 | * | 2/2001 | Towe et al. ............... 204/632 |
| 6,235,166 B1 | | 5/2001 | Towe et al. |
| 6,284,124 B1 | | 9/2001 | DiMascio et al. |
| 6,649,037 B2 | | 11/2003 | Liang et al. |
| 6,758,954 B2 | * | 7/2004 | Liang et al. ............... 204/632 |
| 6,824,662 B2 | | 11/2004 | Liang et al. |
| 2003/0089609 A1 | | 5/2003 | Liang et al. |
| 2004/0079700 A1 | | 4/2004 | Wood et al. |

FOREIGN PATENT DOCUMENTS

EP    1068901 A2    1/2001

OTHER PUBLICATIONS

Li-Shiang Liang, Ph.D., "Deionization—Evolution in Design of CEDI Systems," *Ultrapure Water*, Oct. 2003, pp. 1-5.

* cited by examiner

Primary Examiner—Arun S. Phasge

(57) ABSTRACT

A method and apparatus for connecting water treatment devices is provided. Connecting brackets may allow for a multiple configurations of water treatment devices and can simplify the building of water treatment systems.

25 Claims, 14 Drawing Sheets

INTERCONNECT TUBE

PIPING ADAPTER FOR
CONNECTION TO EXTERNAL PIPING

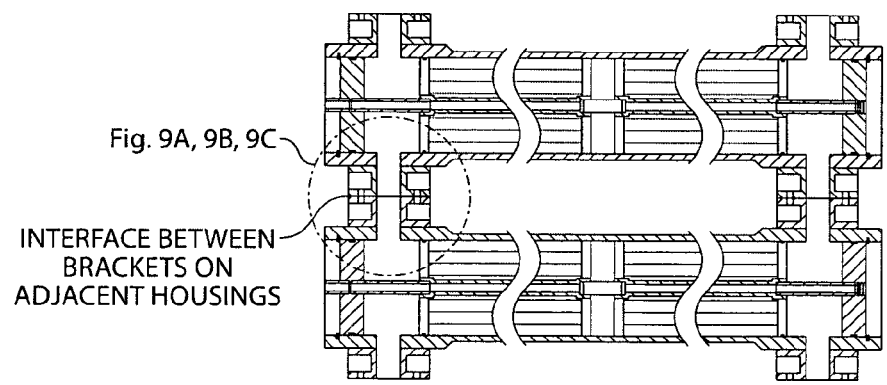
Fig. 9A, 9B, 9C
INTERFACE BETWEEN BRACKETS ON ADJACENT HOUSINGS
Fig. 9
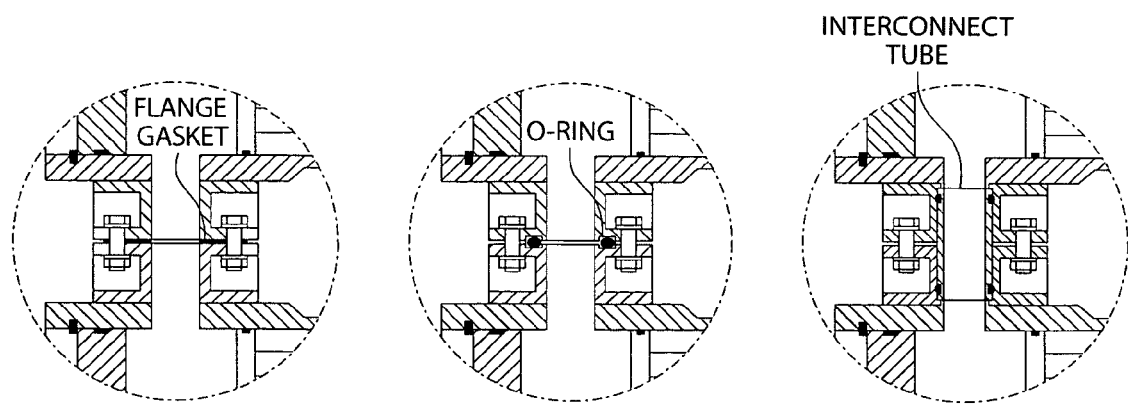
Fig. 9A     Fig. 9B     Fig. 9C

APPARATUS AND METHOD FOR CONNECTING WATER TREATMENT DEVICES

RELATED APPLICATIONS

This application claims benefit of U.S. Provisional Application No. 60/504,140, filed Sep. 19, 2003, which is incorporated by reference in its entirety herein.

BACKGROUND OF THE INVENTION

1. Field of the Invention

The invention relates to water purification devices and in particular to brackets, systems and methods for supporting water purification devices.

2. Discussion of Related Art

Fluid treatment modules include devices and systems for treating fluids, such as water, to alter the chemical and or physical properties of the treated water. Water is often treated to remove impurities. Water treatment modules may include devices and systems such as reverse osmosis (RO) units, deionization units, electrodeionization units, continuous electrodeionization (CEDI) units, polishers, filters including membrane filters, particulate filters, multi-media filters, carbon filters and cartridge filters, disinfection devices, ultraviolet treatment units, distillation units and softeners. In different embodiments, any one or more of these types of water treatment modules may be used. A module typically has a feed for supplying water to the system and an outlet for supplying product from the system.

Water treatment systems such as electrodeionization systems are known in the art. For example, in U.S. Pat. No. 6,284,124, DiMascio et al describe various combinations of ion exchange resins that can be used in Continuous Electrodeionization (CEDI) devices. In pending U.S. patent application Ser. No. 10/272,356, Liang et al describe a CEDI system using a cylindrically shaped pressure vessel. Both of these documents are hereby incorporated by reference herein.

Water treatment modules are often encased in a housing. The housing may serve to contain the device and to isolate the water being treated from the environment. Housings also may serve to support and/or protect the module. Multiple modules may be contained in a housing.

In many applications more than one water treatment module may be used. For example, two modules may be connected in series or in parallel to form a system. Modules are often placed in series when a single module is not capable of producing product of a desired purity or quality. Modules may be connected in parallel, for example, to increase production capacity.

In systems using more than one water treatment module, it is often desirable to place the modules close to each in order to minimize the amount of space required for the system. Compact placement, however, may be offset by the need to provide access to each module in order to make and maintain fluid (and sometimes electrical) connections between modules.

Typically, multiple modules in a system are secured individually on a skid or platform and fluidly joined by fixed or flexible piping that is external of the modules. For example, a system capable of supplying 500 gallons per minute (gpm) of deionized water might consist of ten 50 gpm electrodeionization modules individually mounted on a skid and piped in parallel in order to meet the production goal. Some reverse osmosis (RO) modules may be supported by a rack and frame system. For example, a rack system may have multiple cross pieces that are supported by the legs of the frame system. Individual RO modules may be supported by the cross pieces so that the weight of each module is supported by the frame. The RO modules may be strapped to the frame cross pieces to secure them. Multiple RO modules may be strapped side by side on two or more cross-pieces, with room in between to provide for piping and access. Additional rows of RO modules may be stacked above and supported by a different set of cross pieces. The number of modules that can be used in a system is limited by, for example, the height and width of the frame that is used. An underutilized frame may use more space than the system demands. In addition, the frame members may hinder access to the modules and piping running to, from and between modules.

SUMMARY OF INVENTION

The subject matter of this application may involve, in some cases, interrelated products, alternative solutions to a particular problem, and/or a plurality of different uses of a single system or article.

In one aspect, a bracket for supporting an electrodeionization module is provided, the bracket comprising a plate defining a receiving section constructed and arranged to support an electrodeionization module housing, a first plate edge constructed and arranged to be fastened to a plate edge on a similar or identical bracket, and a second plate edge constructed and arranged to be fastened to a plate edge on a similar or identical bracket.

In another aspect, an end plate for an electrodeionization device is provided, the end plate comprising a block including an integral substantially cylindrical portion for interfacing with a substantially cylindrical electrodeionization device housing, an integral substantially polygonal portion opposed to the substantially cylindrical portion, at least two external edges on the polygonal portion, at least one of the edges constructed and arranged to be fastened to a similar or identical end plate that can be associated with a second electrodeionization device, a seal constructed and arranged to contain fluid within the electrodeionization module, and a fastener for securing the block to an electrodeionization module.

In another aspect, a method of supporting an electrodeionization device is provided, the method comprising steps of providing a first electrodeionization device including a housing, the housing attached to a first bracket at one end of the housing and a second bracket at an opposed end of the housing, providing a second electrodeionization device including a housing attached to a third bracket at one end of the housing and a fourth bracket at an opposed end of the housing, and fastening the first bracket to the third bracket and the second bracket to the fourth bracket wherein the weight of the second electrodeionization device is substantially supported by the first and second brackets.

In another aspect, a method of supporting an electrodeionization device is provided, the method comprising providing a first electrodeionization device including a housing, the housing attached to a first bracket at one end of the housing and a second bracket at an opposed end of the housing, providing a second electrodeionization device including a housing attached to a third bracket at one end of the housing and a fourth bracket at an opposed end of the housing, and fastening the first bracket to the third bracket end-to-end to align the first and second electrodeionization devices along a common longitudinal axis.

In another aspect, a bracket for supporting an electrodeionization module is provided, the bracket comprising: the bracket defining a receiving section constructed and arranged to support an electrodeionization module housing, a first connector section on the bracket, the first connector section constructed and arranged to be fastened to a similar or identical section on a second bracket associated with a second electrodeionization module housing, and a second connector section on the bracket, the second connector section constructed and arranged to be fastened to a similar or identical section on a third similar or identical bracket associated with a third electrodeionization module housing.

Other advantages, features, and uses of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF DRAWINGS

FIGS. 9A, 9B and 9C illustrate three different ways of sealing a conduit formed by the joining of two brackets;

DETAILED DESCRIPTION

Figure 1:
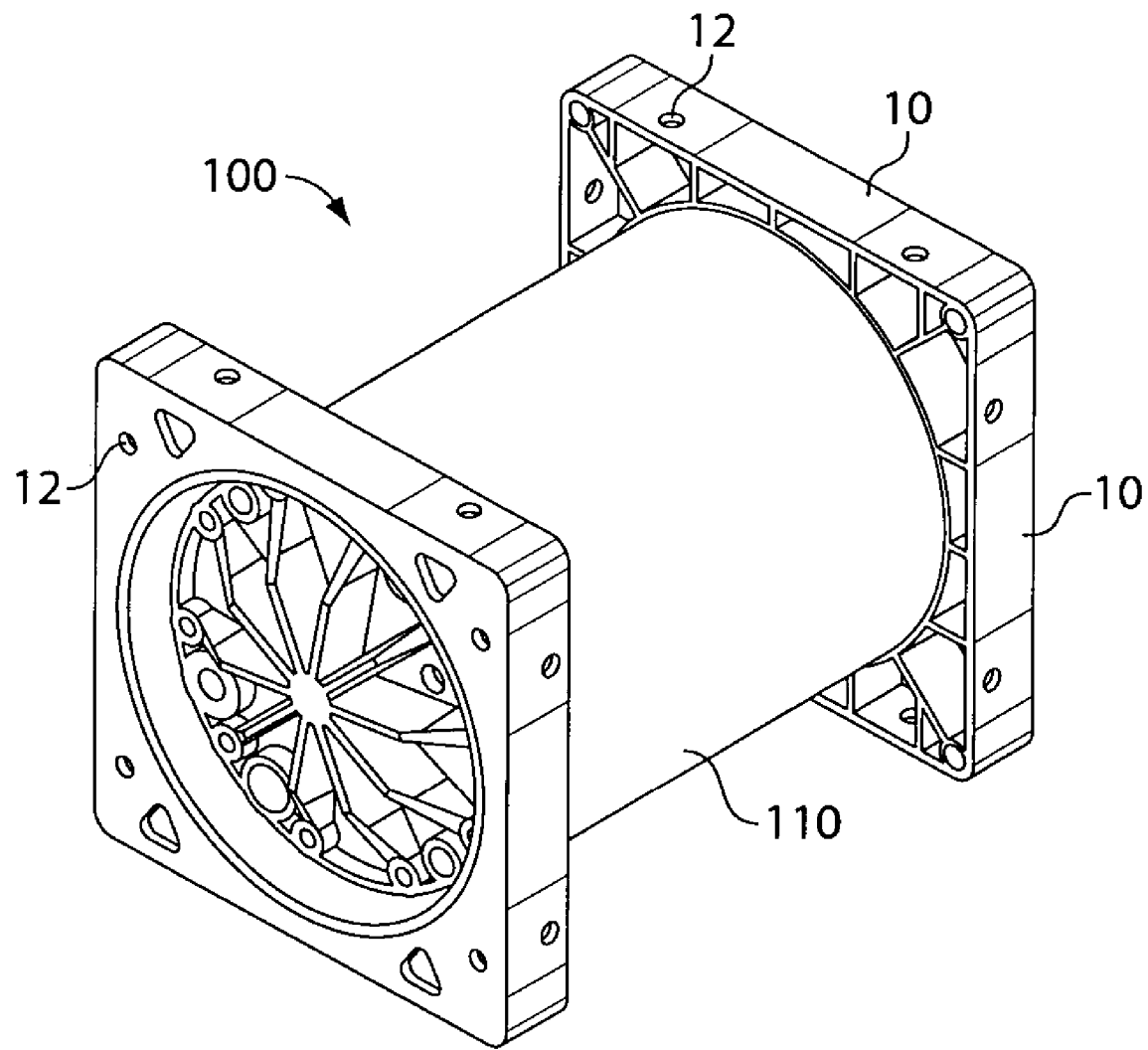
FIG. 1 provides a perspective view of one embodiment of the invention.

In one aspect, the present invention provides a method and apparatus for associating water treatment modules. A water treatment module or device may be any water treatment device or unit that can treat water. A water treatment module may be contained in a housing and may be independently operable or may be used in combination with other modules or other devices. For example, an RO module may be used in combination with a CEDI module.

One group of water treatment devices are referred to herein as electrodeionization devices. Electrodeionization is defined herein as any process that uses an electromotive force to purify water. Electrodeionization includes, for example, continuous electrodeionization (CEDI), electrodialysis and capacitive deionization.

A module is a single operative unit of a water treatment device. A housing may include a single module or may include two or more modules working together.

A bracket may be used to provide support for one or more water treatment modules. The bracket may be permanently or removably attached to a module or housing or may simply support the module or housing without being attached to it. A bracket that supports a module or is affixed or attached to a module is, as defined herein, associated with a module. A single module may be associated with one or more brackets. In some embodiments, a module may be associated with two or more brackets. The brackets may be positioned anywhere on the module and in some embodiments, two brackets may be located at opposing ends of the module or housing.

A bracket may be constructed and arranged to mate or join with another bracket that may be different or similar or identical to the first bracket. By joining two or more brackets together, different modules may be associated with each bracket, and the modules may be immobilized with respect to each other. The brackets, when joined together, may be used to support or substantially support the weight of an entire array of water treatment devices that make up a water treatment system. A rack for storing these treatment devices may be eliminated and water treatment devices can be added or subtracted from the array simply by adding or subtracting individual units that include a compatible bracket. A bracket may include surfaces designed to mate with similar or complementary surfaces on a second bracket. Complementary surfaces may include, for example, a groove on one surface and a ridge on the other. These joining surfaces may be positioned so that when joined to a second bracket the modules associated with each of the two joint brackets are aligned. Alignment may include parallel alignment, perpendicular alignment or other arrangements that result in an organized water treatment system. For example, a bracket may include a surface that, when joined to a surface on a second bracket, immobilizes two water treatment modules to be in parallel alignment with each other. The modules may be parallel in any arrangement, including, but not limited to, side by side, over/under, and end to end. A bracket may include more than one surface for joining to another bracket. For example, one surface may be positioned to join with the surface of a second bracket in order to place the two associated water treatment modules in an end to end configuration and another surface on the bracket may be positioned to immobilize two water treatment modules with respect to each other in a side by side relationship. Another surface may be positioned to join with a second bracket to immobilize two water treatment modules in an over/under relationship. The bracket may include any one or more surfaces that allow it to join with, for example, one, two, three, four, five, six, seven or more other brackets.

One bracket may be attached to another bracket in any manner that allows the associated water treatment devices to be immobilized relative to each other. In many embodiments, brackets are attached to each other so that the attachment is not permanent and the brackets may be unattached if desired. Other forms of attachment may be permanent. Preferably, attachment is secure enough to prevent movement of the devices under the conditions in which the system will be used. In some embodiments a fastener can be used to join two brackets together. A fastener is any device that can secure one bracket to another. Fasteners include, for example, screws, nuts and bolts, adhesive (preferably removable), clamps, tie rods, flanges, and a key and slot type arrangement. In a key and slot arrangement, the key portion of one bracket is slid into the slot portion of another, or the slot can slide into the key. The arrangement may be further secured, for example, by inserting a locking pin to prevent the brackets from sliding apart. In other embodiments, bolt holes in the edges of the bracket provide for proper alignment of the devices when the brackets are bolted together. This arrangement can also provide for a method of applying the proper compression force to the brackets, e.g., by adjusting the torque on each of the fastening bolts.

In one embodiment, a bracket includes a longitudinal surface or surfaces for immobilizing water treatment modules in a side by side relationship. In another embodiment, a bracket may include a lateral surface for immobilizing water treatment modules in a top and bottom arrangement. In another embodiment, a bracket may include a frontal surface for immobilizing water treatment modules in an end to end relationship. Any combination of these may also be used.

A bracket may also include a receiving section designed to support one or more water treatment modules. A water treatment module may rest in or on a receiving section of a bracket and may, for example, be removably attached or permanently attached to the receiving section.

A bracket can include a plate or a plate portion that may be oriented in any direction. As used herein, a "plate" is the structural portion of a bracket that supports a water treatment device. It is not to be confused with the shape attributed to the term by the common meaning of "plate," but rather can take any shape and be of any material. The plate often serves to transfer the weight of a water treatment device to another bracket or to a base, such as the floor. In some cases the plate may comprise the entire bracket. The plate can be, for example, solid, perforated, hollow, or a framework and may in some instances have a convex side and/or concave side. The plate can be a unitary piece or a collection of connected independent pieces. The plate can include a section for receiving a housing. For instance, if a housing is cylindrical, the plate portion may include a cylinder or partial cylinder for receiving the housing. The housing may fit into the bracket or the bracket may fit into the housing. The plate may, alternatively, include two or more fingers that are positioned to secure a housing of a particular shape and size. For instance, the fingers may be oriented to receive a cylindrical or a square housing.

The plate portion may also include one or more edges, typically around the periphery of the plate. The edges may be flat and a series of edges can form a polygon around the outside of the plate. The polygon may have rounded corners and various features on one or more sides. For example, the cross-section of the plate can be a triangle, square, pentagon, hexagon, heptagon, octagon, etc. The edges can include a planar portion designed to be mated with the planar portion of a complimentary bracket, however the edges don't need to be flat or planar. The edges may also include grooves, ridges or other features that can be designed to, for example, facilitate the interlocking of the bracket with a second bracket. The plate can also include an edge that faces away from the water treatment device that is associated with the bracket. This face may be perpendicular, or normal, to the axis of a water treatment device housing that is supported by the bracket. This orientation may be particularly useful when devices are to be arranged end-to-end.

In some embodiments, brackets may be constructed and arranged to receive piping for fluids as well as electrical connections for electrodes.

In one embodiment, a bracket and a housing of a water treatment module may be integral to each other. For example the water treatment housing and the associated bracket may be formed from a continuous piece of material or may be permanently joined together. A bracket may also be integrally joined to a water treatment module housing when the bracket and the housing are joined in such a way that they are not designed to be separated. Integrated structures, therefore include, for example, embodiments where a bracket is joined to a housing by a permanent adhesive, by welding or by pressure fitting. If a bracket and housing cannot be separated without damaging one or the other, then the bracket and housing may be considered to be integral.

It may be preferred that the receiving section of a bracket is shaped to complement a portion of the water treatment module housing. For example, if the water treatment module housing is cylindrical, the receiving portion of the bracket may include a circular portion that is complementary to the water treatment module housing. For example, if a water treatment module housing has a diameter of 18 inches, a complementary receiving section of a bracket may include a circular passageway having an inner diameter of 18 inches (or slightly larger than 18 inches) so that it may receive and retain the water treatment module. A receiving section or a portion of a receiving section may also be tapered to facilitate fitting and securing the module to the bracket. Some examples of bracket designs for cylindrical modules are provided in FIGS. 1, 2 and 3. Brackets may be joined to water treatment modules by any technique that can facilitate retaining a water treatment module in a chosen position. For example, a water treatment module may rest in a U or V shaped channel or may be retained in the receiving section of the bracket by fastening. Fastening may include, but is not limited to, welding, gluing, adhering, pressure fitting, bolting, screwing, interlocking, clamping, and strapping. For example, an adhesive may be applied to either an outer surface of a water treatment module housing or an inner surface of a receiving section of a bracket, or both, in order to join the bracket and module or module housing together. In another embodiment, a cylindrically shaped water treatment module housing may be threaded in order to mate with complementary threads formed on or tapped into the receiving section of a bracket.

Two or more brackets may be joined together in a manner that immobilizes the brackets in relation to each other. Brackets can be joined directly by joining connector sections on each bracket or via one or more intermediate connectors. A surface on a bracket may include a fastener or a fastener receiver designed to receive a fastener. Such fasteners include, for example, bolts and corresponding bolt holes, nuts, clamps, clips, screws, magnets, flanges, ties, straps and adhesives. As used herein, an adhesive is a fastener and a surface that joins to the adhesive is a fastener receiver. Adhesives used to join either brackets to water treatment modules or brackets to brackets are known to those skilled in the art and in some cases may be chosen for adhesion and corrosion properties as well as for allowing expansion and contraction of joined parts.

A bracket may be made out of any material capable of providing adequate support to a water treatment module which is intended to be used with the bracket. A bracket may be made from a material having adequate compression strength to support the weight of one, two, three, four, five, six or more water treatment modules intended to be used in a system employing the bracket. Materials of which a bracket can be made include but are not limited to metal such as aluminum or steel, polymers, wood and combinations thereof. The bracket may be made from material having a coefficient of thermal expansion similar to that of the water treatment module housing. A bracket may be manufactured using methods known to those skilled in the art, such as molding, machining and casting. A combination of techniques may also be used.

A bracket may be of any form, such as solid or hollow or forming a framework. In one embodiment a bracket includes a substantially flat face opposed by a hollow cavity. This may allow access to bolt holes or other fasteners for joining two or more brackets together. Such a design may also minimize the weight of the bracket while retaining adequate strength. For example, a bracket may have, (see, e.g., FIG. 1), a forward face, a lateral face, a longitudinal face and a hollow interior accessible from the rear of the bracket. Each of these faces may provide a surface for joining the bracket to the second bracket. Each face may also include, for example, one or more bolt holes passing from the exterior of the bracket to the hollow interior of the bracket so that a bolt may be passed through the hole and an adjoining bracket hole after the two brackets have been brought into proximity.

The modules may be used to provide systems of any design. For example, water treatment modules may be immobilized with respect to each other end to end, side to side or over/under. In addition, any one or more of these arrangements may be used with a system. In one example, a front face of a bracket may be joined to the front face of a second bracket to place the respective water treatment modules in an end to end relationship. A lateral face on the same bracket may be joined to a lateral face on a second bracket to put the respective water treatment modules in a top and bottom relationship to each other. The lower bracket may support some or all of the weight of the water treatment module that is retained by the upper bracket. A longitudinal surface may be joined to a longitudinal surface of a second bracket in order to immobilize two water treatment modules in a side by side relationship. In a side by side relationship, one bracket may be used to support the weight of the adjacent bracket and its water treatment module, however, it is often preferred that the weight of a water treatment module be supported by a bracket below.

FIG. 1 provides an illustration of an example in which a pair of brackets is used with a cylindrically shaped electrodeionization device. Brackets 100 surround the cylindrical housing 110 of the electrodeionization device. In this case, each of the brackets has four substantially flat edges 10 that can be joined to additional similar brackets. Each of the brackets contains one or more bolt holes 12 that can be used for receiving bolts to connect the bracket to an adjacent bracket. The bracket itself is substantially hollow having a flat surface facing axially away from the water treatment module. The flat surfaces on the edges of the bracket are substantially parallel to the axis of the water treatment device or pressure fitting.

Figure 2:
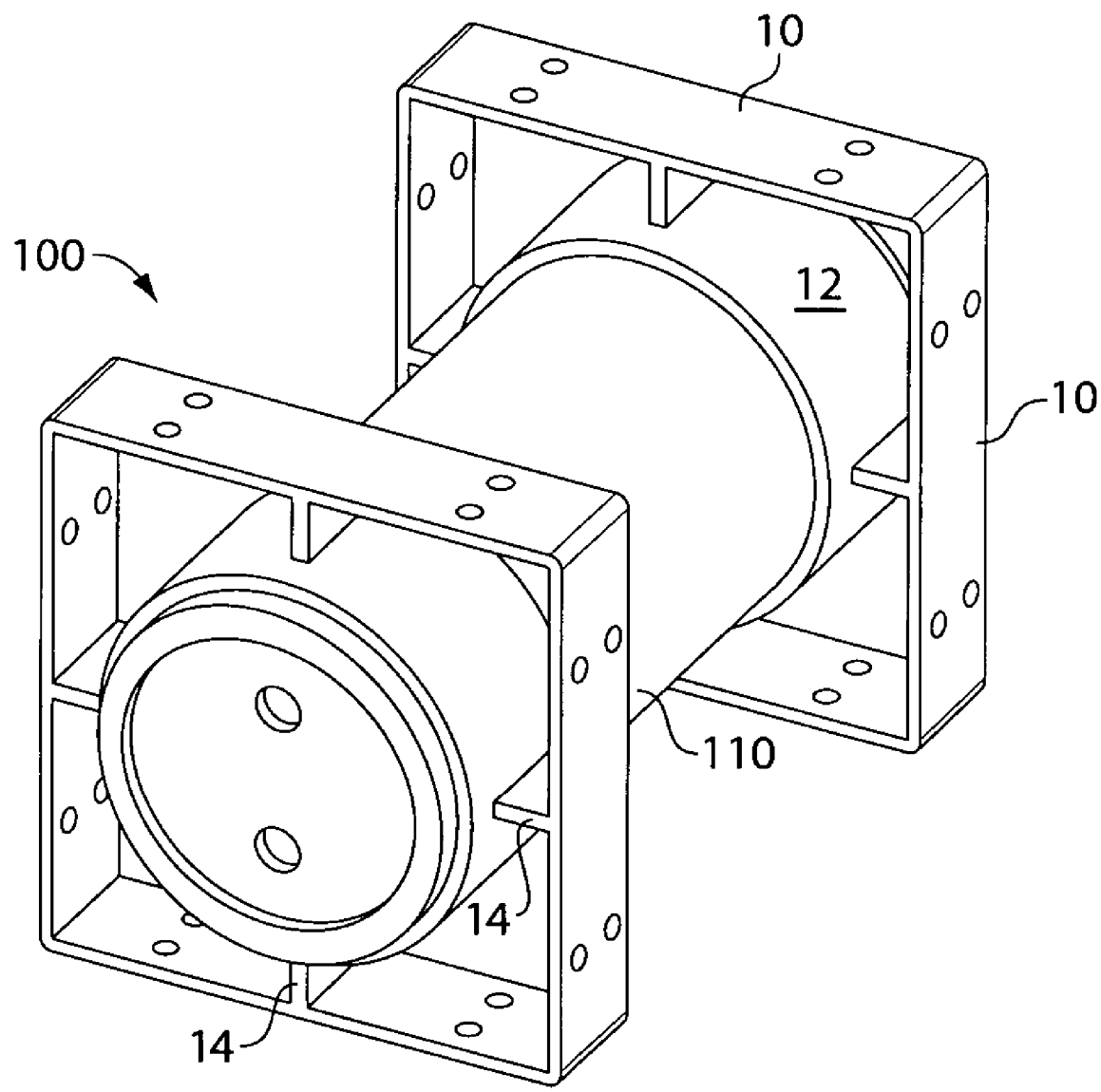
FIG. 2 provides an illustration of another embodiment of the invention.

Another embodiment of a bracket is provided in FIG. 2 which illustrates a design different from that shown in FIG. 1 in that four fingers 14 are used to hold a cylindrical collar 12, that in turn can hold the cylindrical housing in place. Alternatively, the fingers can be used without the collar. The housing can be slid into each bracket or the bracket can be slid over the housing and the housing can be secured to the bracket by, for example, applying an adhesive.

Figure 3:
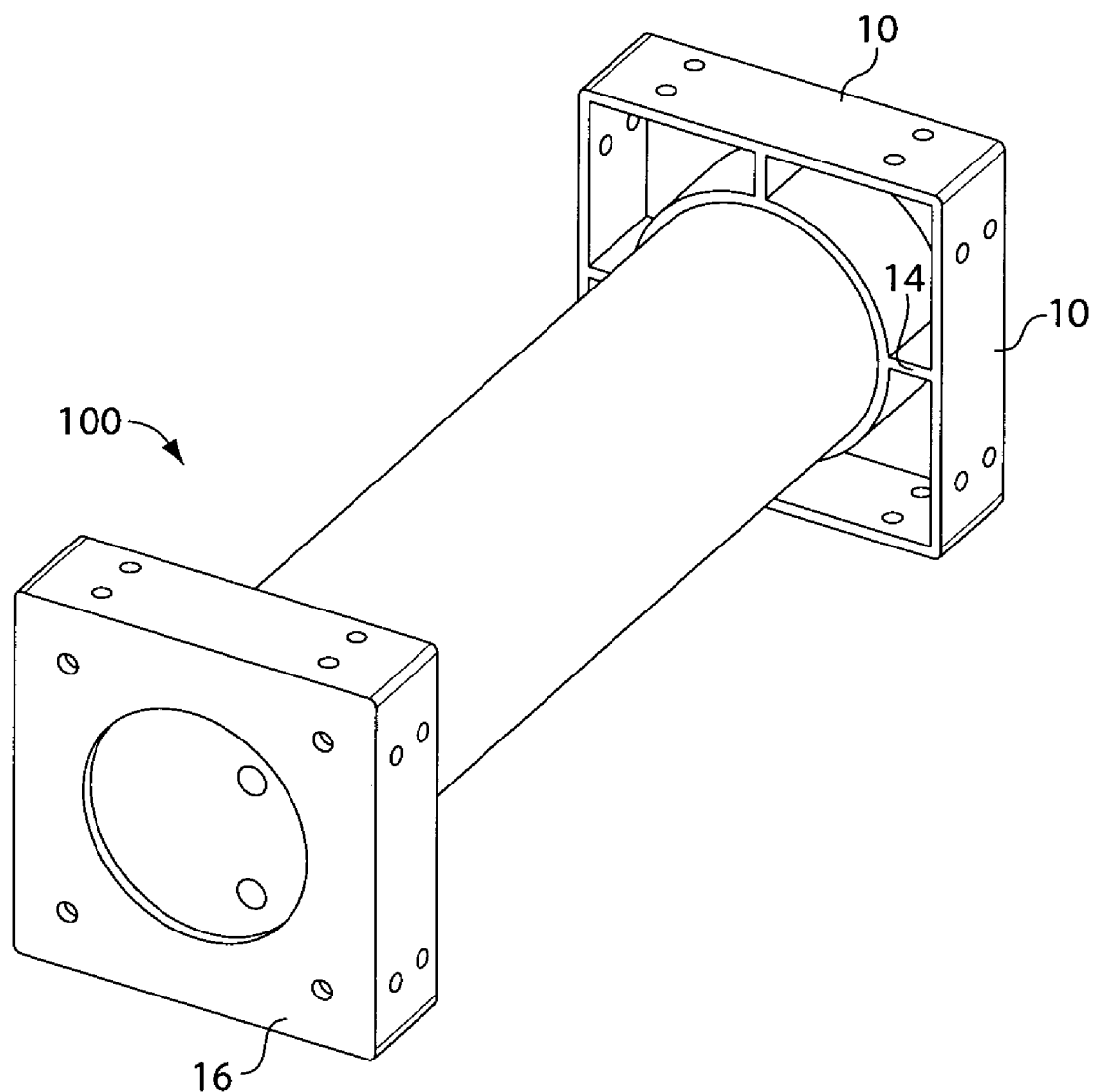
FIG. 3 provides a perspective view of another embodiment of the invention.

FIG. 3 provides an illustration of another embodiment that is similar to that shown in FIG. 2 except that a flat face 16 has been added to the bracket to facilitate the attachment of additional modules end to end.

Figure 4:
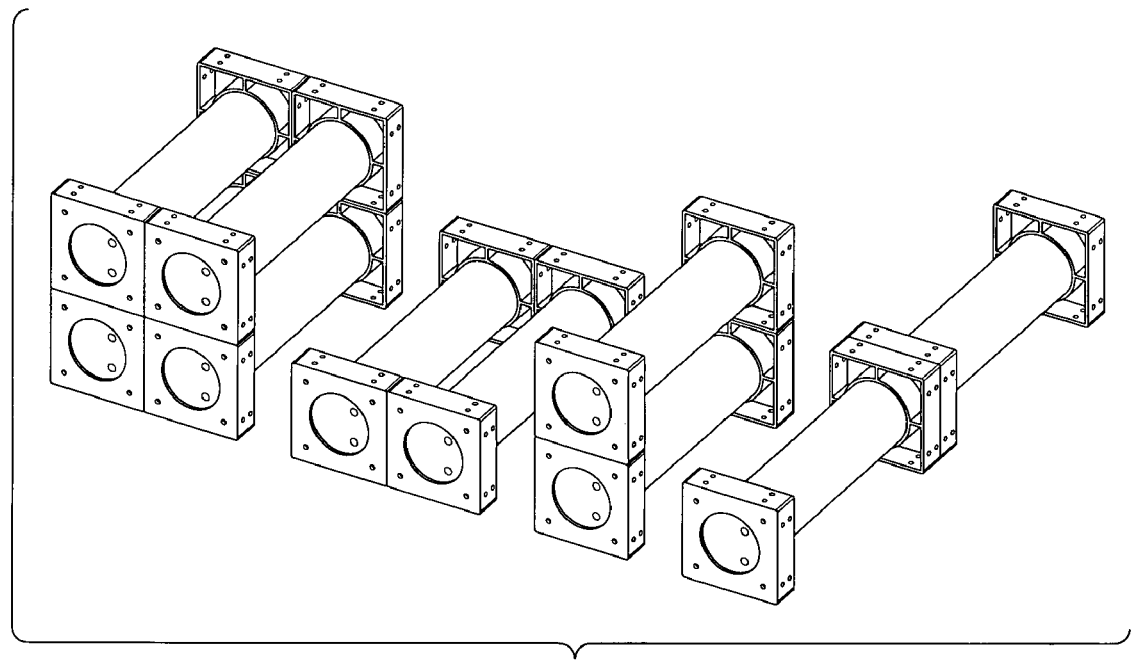
FIG. 4 provides a perspective view showing some of the ways in which water treatment devices can be joined using the invention.
Figure 5:
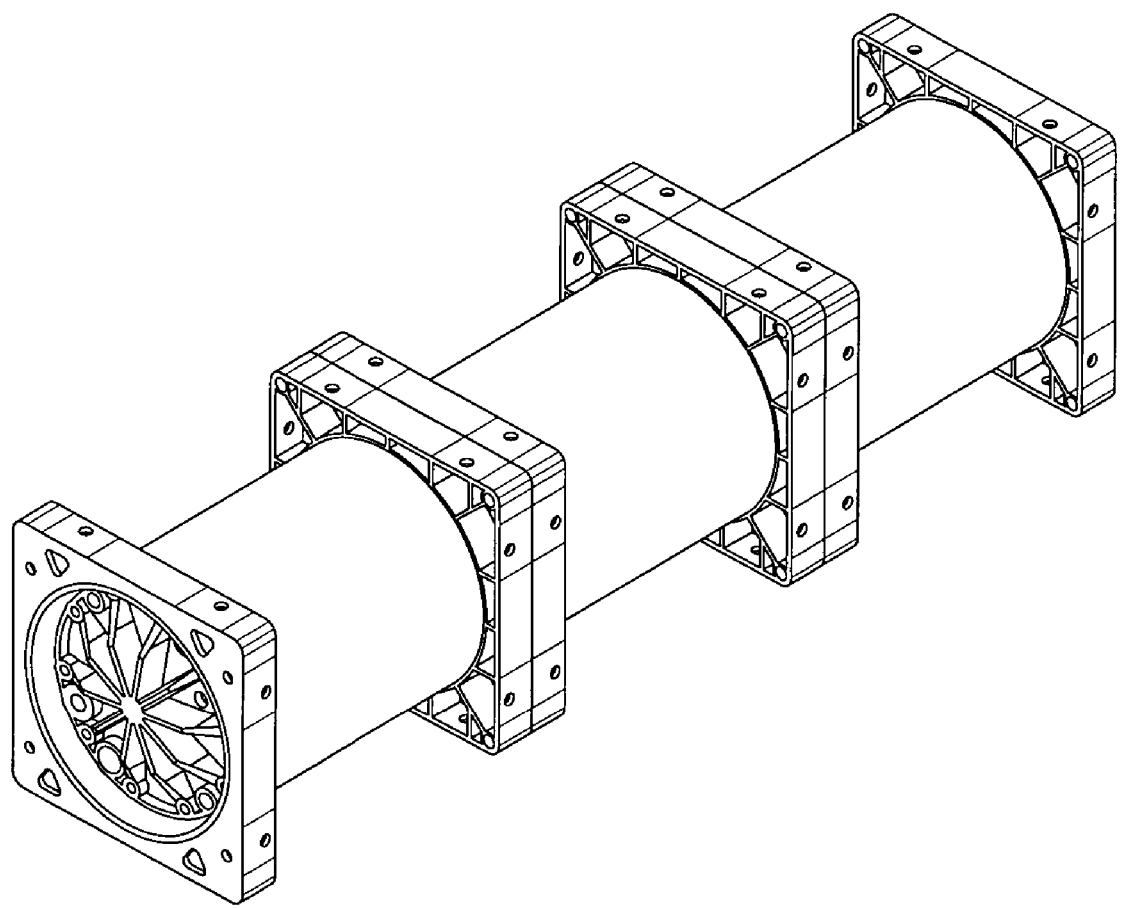
FIG. 5 shows three water treatment devices in an end-to-end confirmation.

FIG. 4 illustrates a water treatment system in which electrodeionization devices have been attached via brackets of the invention to place adjoining electrodeionization modules and housings end to end, side to side and above/below. FIG. 5 provides a more detailed representation of three water treatment housings that have been joined end to end using brackets. After being joined end-to-end, modules may be mounted horizontally, as shown, or may be mounted vertically. When vertically mounted, the housing of the lower modules should be of adequate strength to support the additional weight. The system shown in FIG. 6 builds on that of FIG. 5 and shows an array of water treatment devices that have been built vertically and horizontally using only the brackets to support the water treatment devices. The system includes a series of brackets 100 serving to support eighteen water treatment devices that have been joined together by brackets. Also included is a power supply 103 and the entire system can be mounted on a skid 106 although the system may also be simply mounted on the floor.

In another embodiment, brackets may be placed at both ends of the housing of a water treatment device. For example, an electrodeionization device may have a cylindrical housing with a bracket affixed to each end of the cylindrical housing. The two brackets may be used to support the housing and the module or modules contained therein and may be also be used to connect the water treatment device to other water treatment devices either end-to-end, top-to-bottom or side-to-side. The two opposed brackets at opposite ends of a water treatment device may be connected to each other via only the housing of the water treatment device itself. There need not be external framing or tie-rods or other devices that connect one bracket to the opposing bracket.

Figure 7:
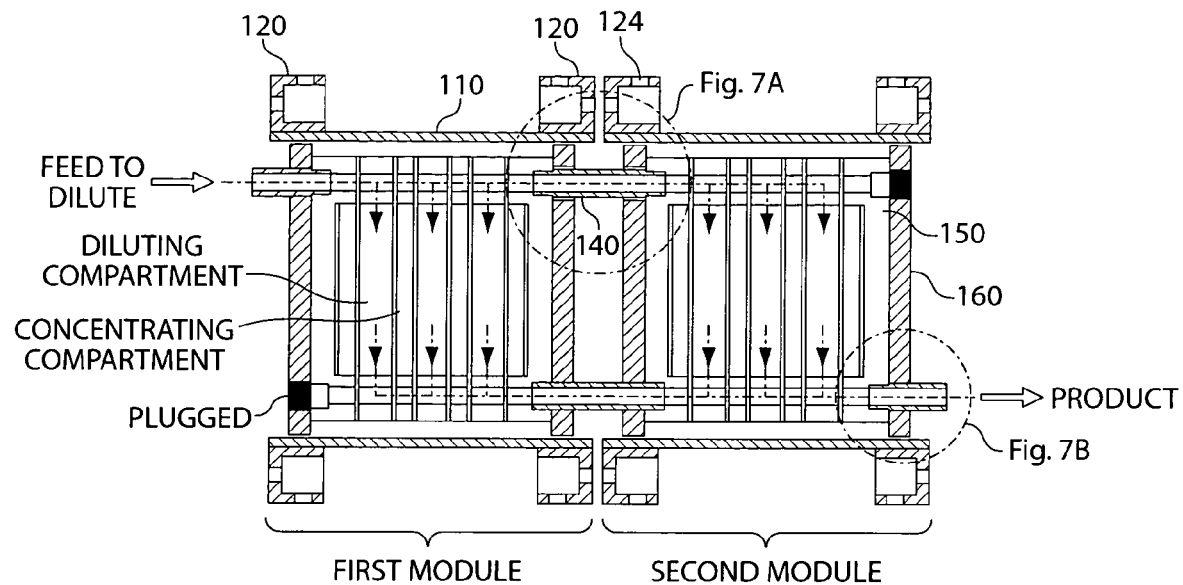
FIG. 7 provides a cut away view of two electrodeionization devices that have been joined by a bracket.
Figure 7A:
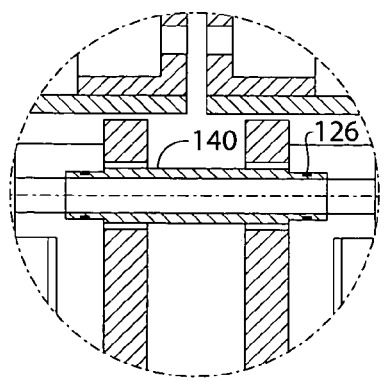
Figure 7B:
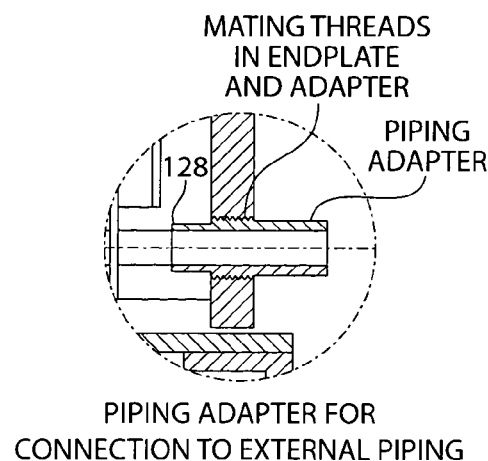

FIG. 7 provides a cutaway view that illustrates how two modules may be plumbed together using a bracket of the invention. Bracket 120, which may be the same, for example, as the bracket shown in FIG. 1, 2 or 3, can be used to join the first module together with the second module as well as to retain the first and second module together after connecting. Each of the electrodeionization devices includes a housing 110, in this case a cylindrical housing made of a filled polymer. Also shown is end block 150 and end plate 160. Similar end blocks and end plates are paired on the opposite side of each of the electrodeionization devices. Each of the end blocks includes a groove that in turn contains an O-ring 172 that provides a fluid tight seal between the end block and the housing. Interconnect tube 140 can be used to provide fluid flow between the first and second module. Interconnect tube 140 may include a groove around each end that can receive O-ring 126 that can provide a fluid-tight seal. Alternatively, gasket 128 may provide a fluid-tight seal and gasket compression can be supplied by the bracket fastener, for example a bolt, that provides a compression force pushing both ends of the interconnect tube against a complementary shoulder in each of the electrodeionization devices. Alternatively, threads may be used to provide the force to compress the gasket. Threads may be preferred for piping at an end of a unit where no additional module is available to supply a compressive force. By plugging two of the ports 170 as shown, feed water can be fed in parallel to each of the two modules. Alternative plugging arrangements can allow for an in series arrangement of the two modules. In cross section, bracket 120 includes a hollow section 122 and bolt holes 124. In this case, the bracket completely surrounds the housing 110 and is affixed to the housing with an adhesive.

In another aspect, the invention provides for an electrodeionization module that provides for a variety of piping options. In one embodiment, a cylindrical CEDI module may be piped at one end or both ends. For example, connecting feed, product, concentrate and reject piping to a single end can provide for space savings and convenience as the opposing end of the module may be free of piping. At each end of the module, ports (connectors) may be included for any one or more of feed, product, concentrate and reject lines. Ports that are not in use may be blocked. For instance if a feed port at one end of the module is to be used, the feed port at the opposing end of the module may be blocked by placing a plug in the connector. Such a port may also be connected via piping to a second or additional module to provide flow to the second or additional module. Multiple modules may be connected so that water flows between them either in series or in parallel. In one embodiment, the flow through the cells in a CEDI module is perpendicular to the longitudinal axis of the module. Therefore, a single line or manifold can provide flow for each cell from one end of the module to the other. The line may connect a port on one end to a port on the opposing end, with flow access to each cell in between. Product, concentrate and reject may be arranged in a similar manner so that access to each may be provided through either end of the module. By piping and plugging various ports, a single module may be configured differently for different systems and may be used in parallel, in series, or a combination of both.

Figure 6:
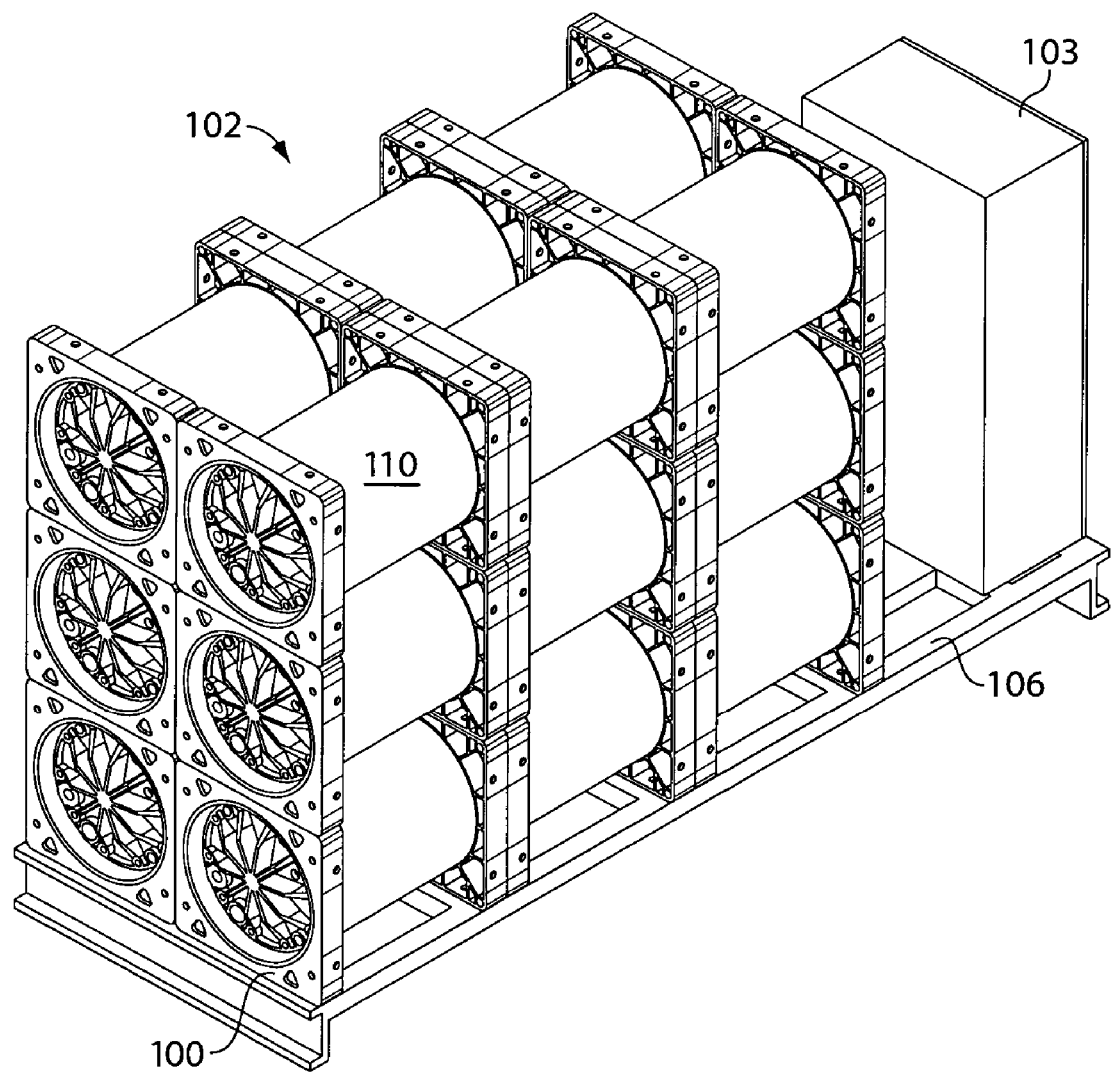
FIG. 6 provides a perspective view of a water treatment system including an array of water treatment devices and an electric supply.

The end blocks 150 are typically made of non-conducting material and house the electrodes. End plates 160 are typically fabricated of metal for high mechanical strength. Typically, tie-rods pass through the end plate, end block, stack and opposing end block and end plate in order to compress the stack. The "stack" is the water purifying portion of the device that includes, if appropriate, spacers, membranes and electroactive media. Preferably the end plate 160 is of a rigid material. The positioning of the bolt holes on the bracket allow for end to end (axially) connection of electrodeionization modules, side by side (laterally) connection of electrodeionization modules or top to bottom (vertically) connection of the modules. Thus, systems comprising multiple water treatment modules in different configurations may be made from the same modules and housings. Some of these configurations are shown in FIG. 4. FIG. 5 illustrates three different electrodeionization modules that have each been connected in line (axially) with the others. Although the modules are connected in line, they may be plumbed to work either in parallel or in series. When multiple groups of these modules are stacked together, an array of electrodeionization modules may develop as is shown in FIG. 6. As shown in FIG. 6, the brackets may be used to support the entire weight, or substantially the entire weight, of the electrodeionization devices. Thus, additional columns or rows of devices may be added by simply connecting the associated brackets to those already present.

In one embodiment, an array of electrodeionization devices may be designed so that the devices are in fluid communication with at least one other device yet no piping between devices is required. For example, each device may be attached to another device via a bracket that includes a conduit for providing fluid communication between devices. In this manner, external piping, via rigid or flexible can be eliminated or reduced. The elimination of such external piping can reduce the chance of leakage due to the failure of the external piping. Conduits contained inside brackets may be designed so that they are integral to the bracket and are not positioned where there may be abraded or otherwise damaged during transportation or use. Furthermore, the bracket may be made of, for example, a strong non-corrosive material such as a metal or hardened polymer that can provide virtually a limitless lifetime to the conduits contained therein.

Figure 8:
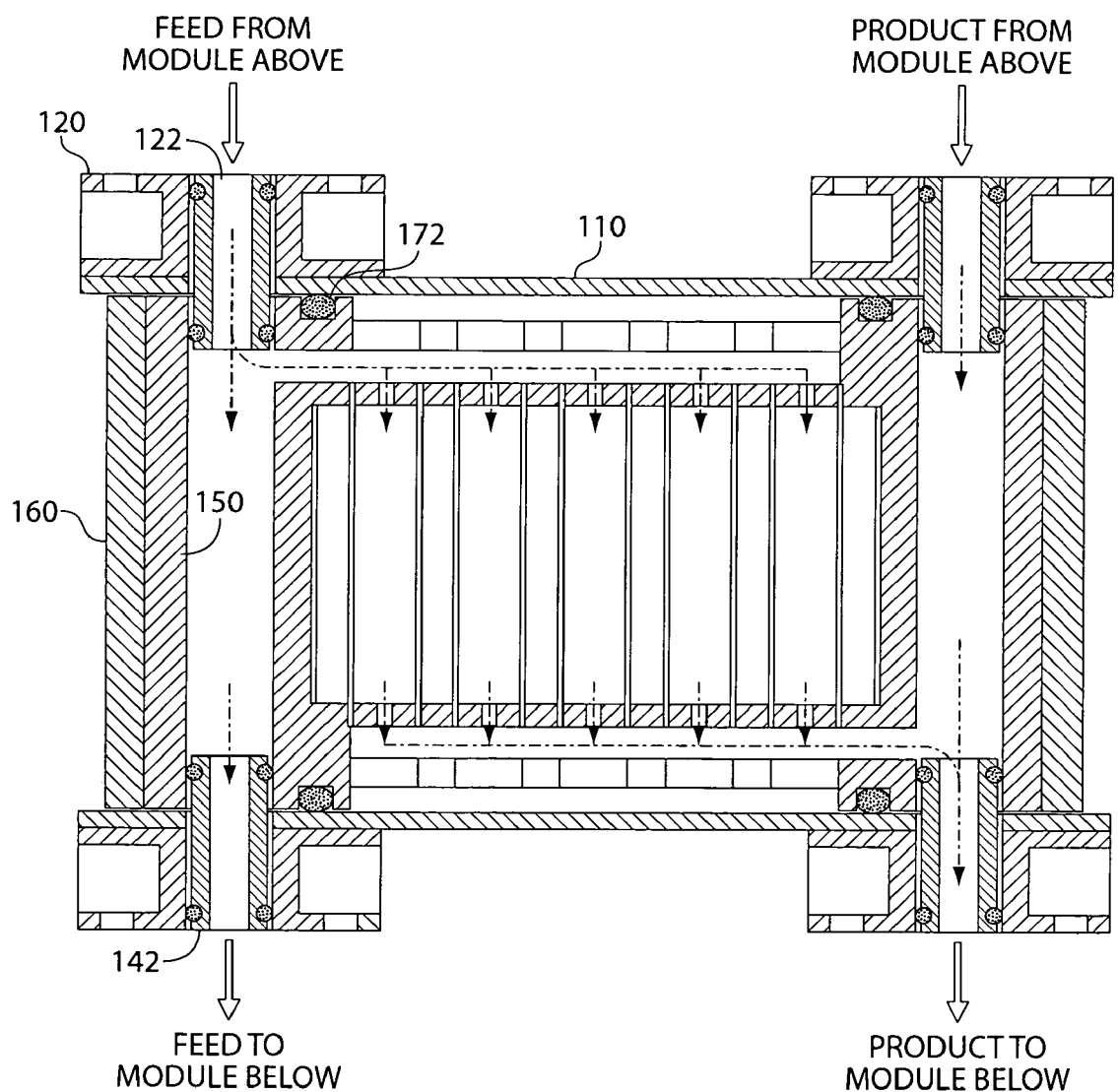
FIG. 8 provides an illustration showing an electrodeionization device including brackets containing fluid conduits.

FIG. 8 illustrates an embodiment where bracket 120 includes a fluid passageway 122 that can be used to feed fluid to a water treatment device or remove fluid from a water treatment device. For example, as shown in FIG. 8, feedwater may enter bracket 120 at conduit 122 which is in fluid communication with a conduit passing through end block 150. From end block 150, feedwater may flow to a manifold that feeds depletion compartments 180 and concentration compartments 190 as well as continuing down the end block 150 and into the lower edge of bracket 120 to feed another module that can be mounted below the module shown. The end plates 160 may be drawn together by the use of tie-rods as provided in other examples. Bracket 120 can make a fluid connection with another bracket by connecting the conduits 122 via an interconnect tube or by a direct connection. Preferably, when a direct connection is made, an O-ring or other seal may be placed between the two brackets at the point where the two conduits join. When the brackets are bolted together the compression force can provide a seal that prevents leakage from the bracket interface. Each bracket may include one, two, three or more conduits and the conduits within a given bracket may be fluidly in communication with each other or may be separate. Furthermore, one or more of these conduits may be plugged if, for example, the water treatment module is not connected to the maximum number of water treatment modules allowed by the bracket. Conduits 122 may include a taper or internal threading, for example, to allow for the retention of a plug. Preferably, the bracket can supply feedwater to the system at operating pressures and temperature. For example, these temperatures may include room temperature, greater than room temperature, greater than 60° C., and greater than 85° C. Pressures may include pressures greater than 50, 100 or 150 psi. In some embodiments, the use of the bracket allows for elimination of any external piping, either flexible or rigid, and all fluid flow between modules can pass from one module to the next exclusively through one or more brackets.

FIG. 9 provides examples of how fluid-carrying conduits in adjoining brackets can be sealed. In FIG. 9A, a flange gasket is used to seal the joint. In FIG. 9B, an O-ring is used and in FIG. 9C, an interconnect tube including two O-rings can be used. Any of these techniques and variance thereof can be used to provide a fluid-tight seal that can withstand operating pressures of greater than 50, greater than 100 or greater than 150 psi.

Water treatment modules that are not aligned in an end to end arrangement may use external piping to join modules in series or in parallel. Preferably, a bracket includes an opening that provides a passageway for fluid and/or electrical connections to and/or from a module.

Figure 10:
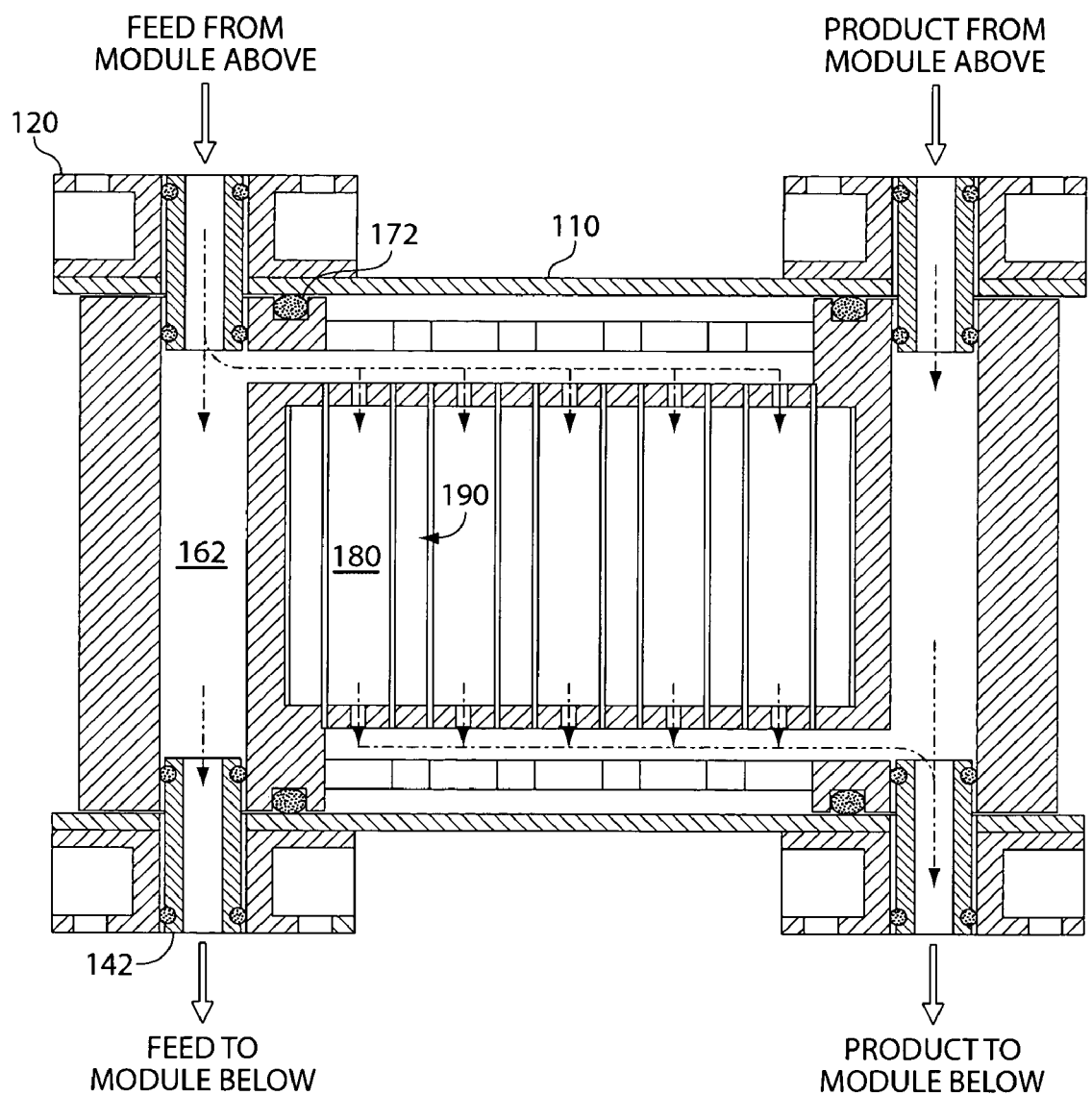
FIG. 10 provides a cut away illustration of an electrodeionization device employing brackets and an end cap.

The embodiment illustrated in FIG. 10 in cross-section is similar to the embodiment of FIG. 8 except that the end plate 160 and end block 150 have been combined into a single unit, end cap 162. End cap 162 may provide both the function of an end block and the function of an end plate. For example, end cap 162 may be non-conductive and include the electrodes as well as fluid conduits to feed the depletion and concentrating compartments. Furthermore, end cap 162 may be rigid enough so that tie-rods passing through the end cap can provide compression to the stack and to the end cap itself. The one piece end cap can be made out of a suitably rigid non-corrosive material such as a polymer reinforced with fibers or beads. The fibers or beads may be, for example, glass or carbon. A filler may also be used. Fillers include glass, carbon and mineral. The end cap may also have an internal core of metal to provide rigidity and an outer covering of a polymer material to provide, for example, adequate rigidity with non-corrosive and non-conductive characteristics. The end cap 162 may include an O-ring 172 to provide a seal between the end cap 162 and the housing 110. Also included is connecting tube 142 to carry fluid from the end cap to the bracket.

Figure 11:
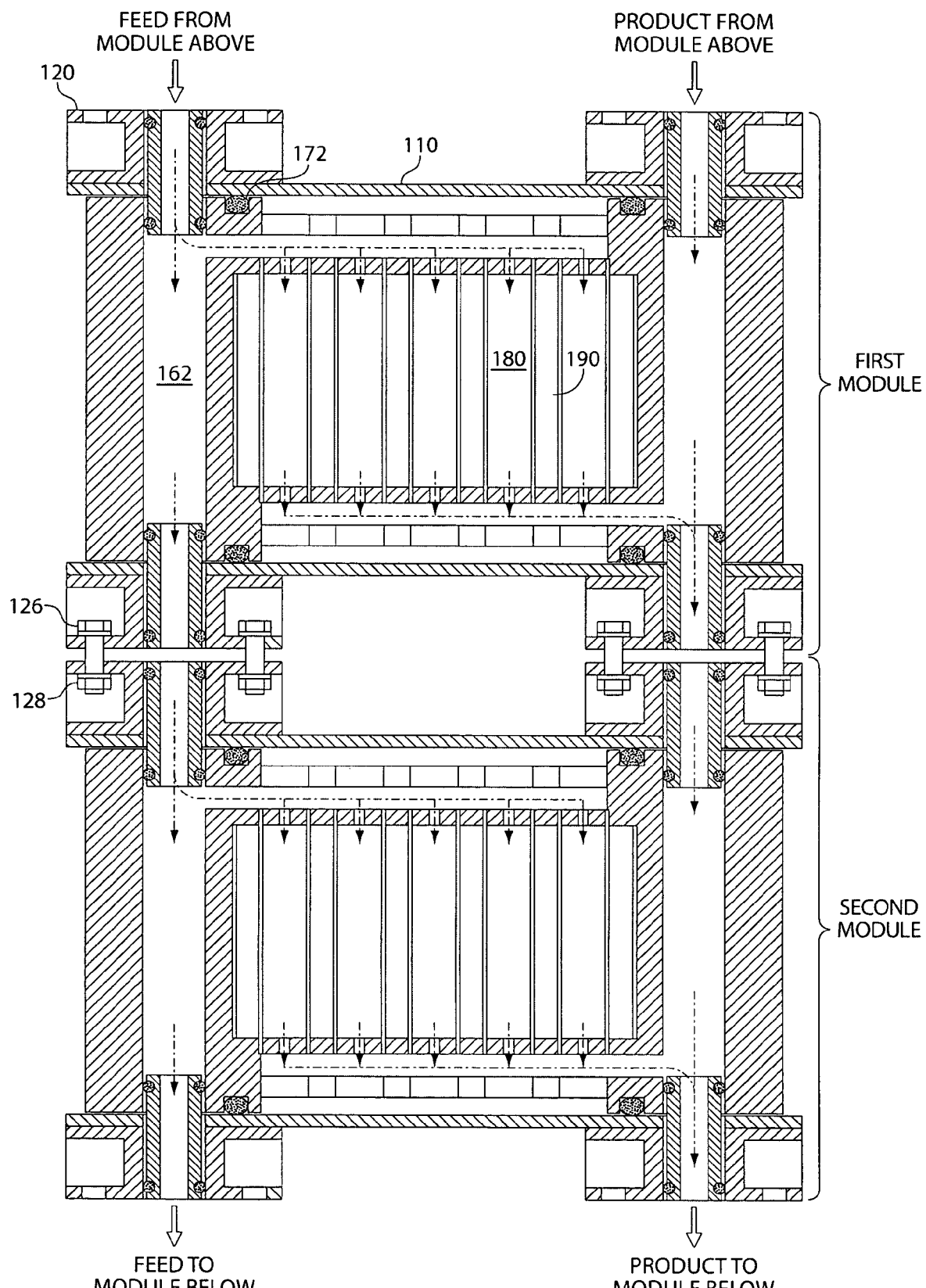
FIG. 11 illustrates two of the devices of FIG. 11 connected by two brackets that include fluid conduits.
Figure 12:
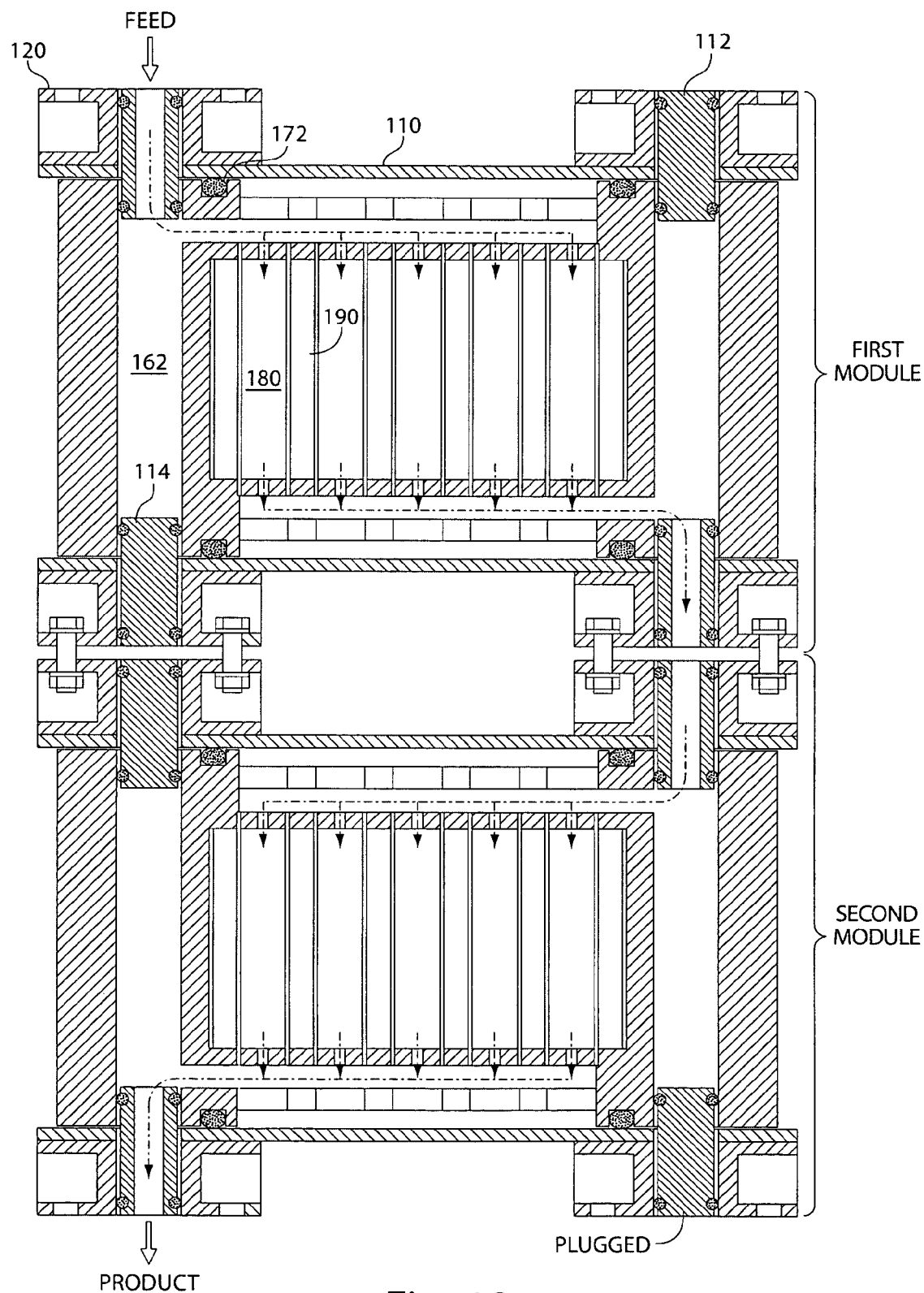
FIG. 12 provides a cut away view of a water treatment system similar to that in FIG. 12.

FIG. 11 illustrates in cross-section a water treatment system including two of the modules sown in FIG. 10. Two adjacent brackets 120 can be pulled together with a fastener, such as bolt 126 and nut 128. Compression provided by the bolt or series of bolts can provide a seal between the brackets either with or without the use of an interconnect tube. As shown, the two modules are plumbed in parallel but with plugging, as shown in other examples, the system can be plumbed in series as well. Each of the modules may include an end cap 162 that provides the function of both an end plate and an end block. FIG. 12 provides a configuration in which by using plugs 114 and 112 the modules are arranged to treat water in series.

Figure 13:
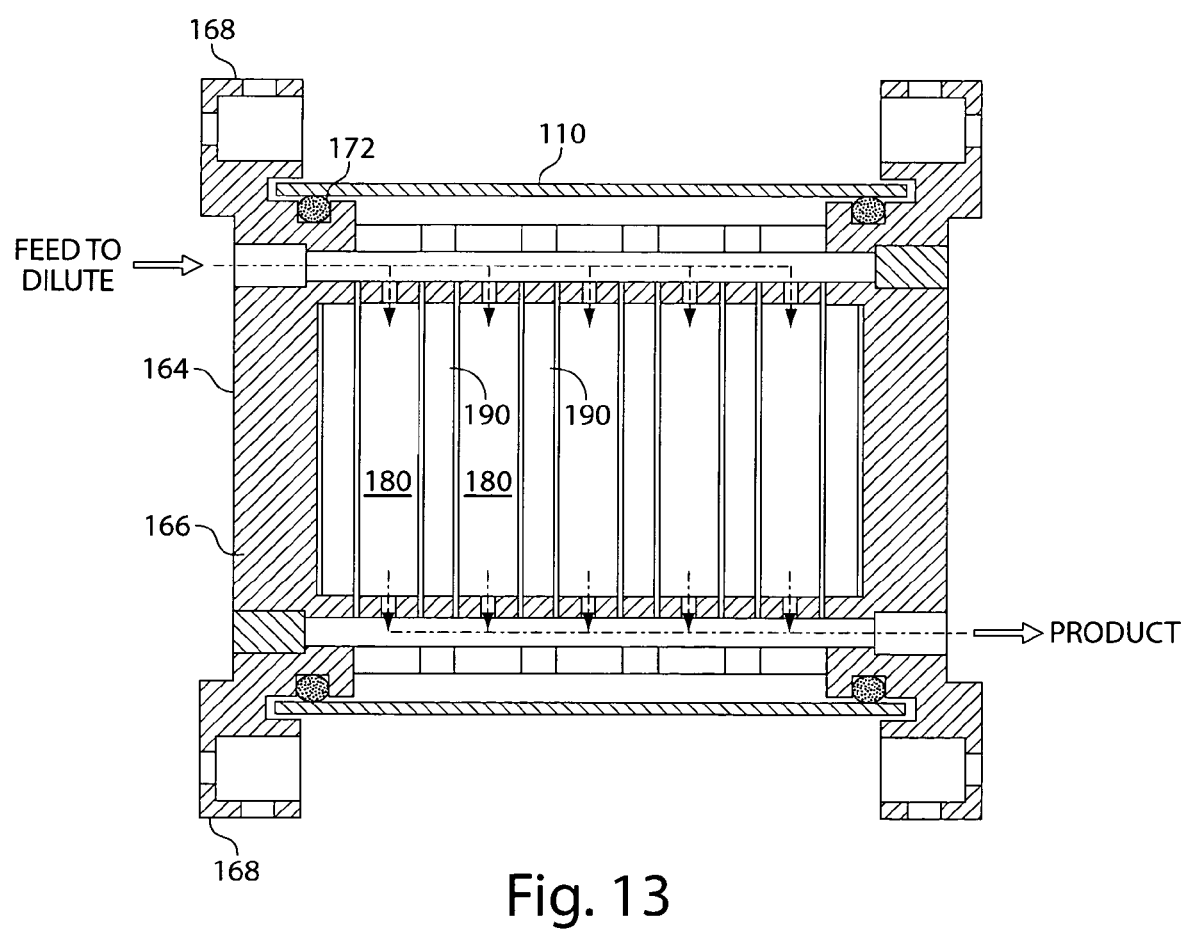
FIG. 13 provides a cut away view of an electrodeionization device that includes two end connectors that are integral with the brackets.

In another embodiment illustrated in FIG. 13 the end block, end plate, and bracket can be combined into a single unit, "end connector" 164. End connector 164 may include a central portion 166 that can provide the function of end cap 162 as in the previous example. Also included are bracket portions 168 that can integrate the functions of a bracket with the functions of the end block and end plate. The end connector may be held in place in any number of ways including a passage of tie-rods through the stack and each end cap. The end cap may be adhered to the housing 110 using an adhesive, or the entire end cap may be screwed into the housing by threading a portion of the end cap and a portion of the housing. A fluid tight seal may be provided by O-ring 172 which can be deformed by compression of the two end connectors toward the stack. The bracket portion 168 may include fasteners such as those in the brackets described in previous embodiments. Likewise, arrays of water treatment modules may be constructed by connecting one bracket portion to a bracket portion of another module. The end connector may be made from the same materials as the end cap, described above.

Figure 14:
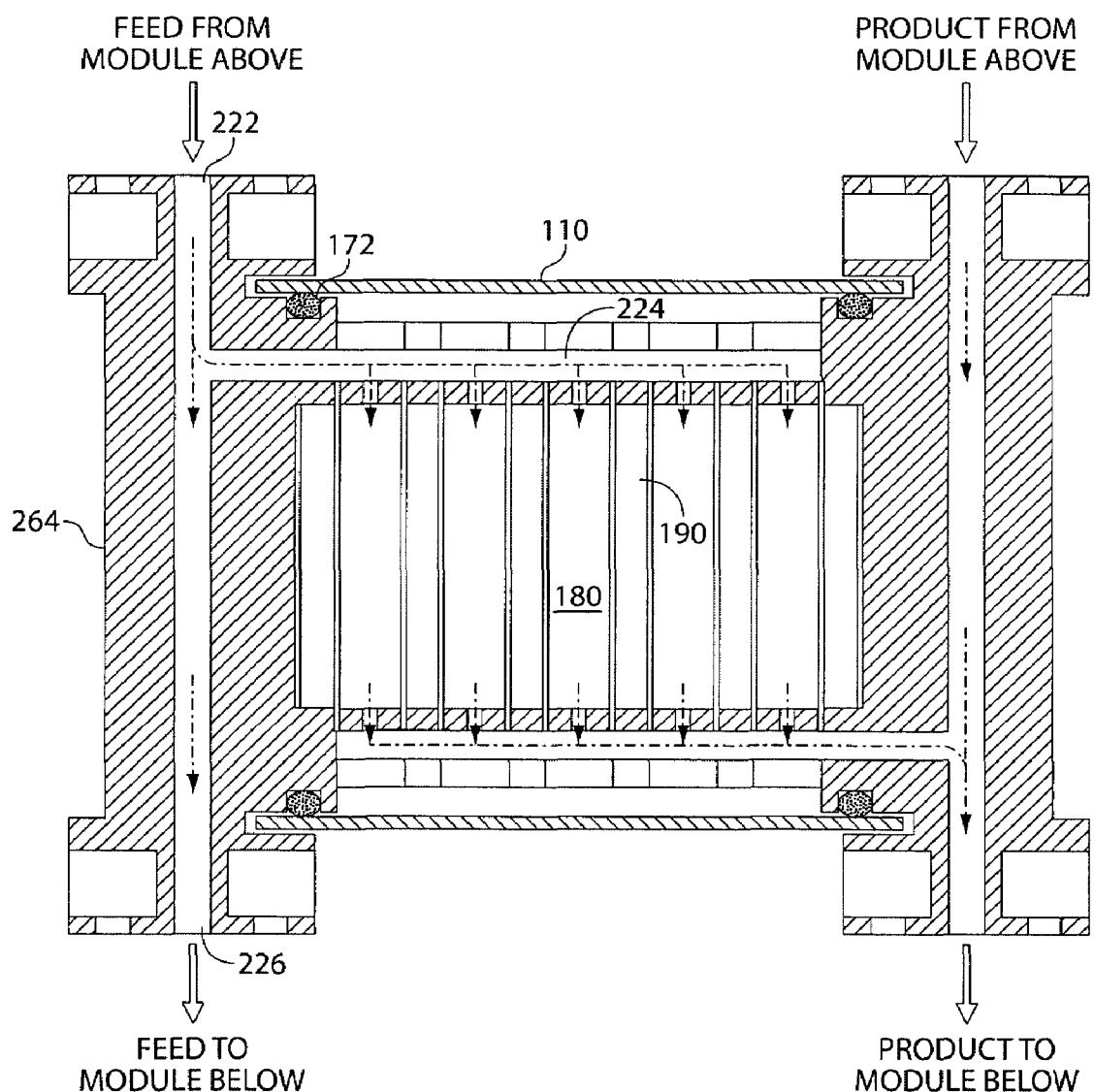
FIG. 14 provides a cut away view of an embodiment, where a single unit end connector includes fluid conduits for supplying fluid to the stack.

The embodiment shown in FIG. 14 is similar to that of FIG. 13 except that end connector 164 has been replaced by end connector 264 that includes conduits for feeding water to and from the water treatment device. For example, conduit 222 can receive feedwater from a module upstream of conduit 222 and can then feed manifold 224 as well as conduit 226 that can feed an additional module. As with previous examples, different configurations and plugging systems can be used so that modules may be placed in parallel, in series or a combination of both. End connector 264 provides all the function of an end block and end cap and a bracket. It may be attached to housing 110 by the use of tie-rods that compress the two end connectors together, by adhering the end connector to the housing 110 or by connecting the end connector via threads that interface with complementary threads in the housing. Note that the housing may include male or female threads and the end connector may include male or female threads. In the case of an end cap or an end connector, the end caps may also be held in place by using tie-rods that do not extend through the stack but instead extend through the bracket portion of the end cap or end connector and are external of the housing 110. For example, a series of tie-rods may surround a cylindrical housing 110, the ends of the tie-rods being bolted to the bracket portion of the end cap or end connector. As with previous embodiments, an array of any number of rows and columns of water treatment devices may be used in a system. Water treatment devices need not be the same. For instance, RO devices may be mixed in an array with electrodeionization devices.

In any of the embodiments described herein, the dilute compartments of the electrodeionization device can be plumbed in parallel or in a series while the concentrate compartments may be independently plumbed in parallel or in series. The dilute and concentrate compartments need not be plumbed in the same manner.

It is preferred that end connector 264 be non-conducting on all external surfaces when used with an electrodeionization device. This helps, for example, to eliminate any likelihood of the electrical potential inside the device that carried to the exterior of the device wherein an operator could be exposed. Preferably the surfaces are non-metallic to avoid corrosion yet the end connector should be structurally strong enough to maintain adequate compression on the stack even when internal pressures may be greater than 50, greater than 100 or greater than 150 psi. The material should also be strong enough to allow multiple modules, or rows of modules to be mechanically fastened together and to provide adequate support for the weight of the array. The end connector, if of adequate compression strength, can eliminate the need for a rack or other means to support the modules in an array. The elimination of such a rack allows for easier access to individual modules as well as easy increase or decrease in the size of the entire system by adding or removing any number of modules. The size of the support structure for the array increases with the addition of modules and decreases with the subtraction of modules. No space is wasted by having unused rack space, and the size of the system is not limited by the size of a particular rack.

In one embodiment and end cap or end connector can be made using the technique of insert molding. In insert molding, a polymeric material is molded around a metal insert. The metal insert can provide a majority of the mechanical strength and the polymer provides non-conductive surfaces and electrical insulation. A metal insert may be made by methods known to those skilled in the art such machining, casting or forming. The metallic insert is then placed into a mold and a polymer can be injected into the mold cavity. Molding techniques may be chosen from, for example, injection molding, structural form molding or reaction-injection molding.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B", when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one act, the order of the acts of the method is not necessarily limited to the order in which the acts of the method are recited.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system comprising:
   a first electrodeionization device comprising a housing;
   a first bracket attached to the first electrodeionization device wherein the first bracket comprises: a plate defining a receiving section shaped to conform with a share of a portion of the housing and constructed and arranged to support a weight of the first electrodeionization device;
   and a first plate edge positioned on at least one of an outer periphery and a face opposite the receiving section constructed and arranged to be fastened to another plate edge;
   a second electrodeionization device; and
   a second bracket attached to the second electrodeionization device and joined to the first bracket,
   wherein a longitudinal axis of the first electrodeionization device is substantially parallel to a longitudinal axis of the second electrodeionization device.

2. The system of claim 1 wherein the first bracket is joined directly to a third bracket attached to a third electrodeionization device wherein a longitudinal axis of the third electrodeionization device is substantially parallel to the longitudinal axes of the first and second electrodeionization devices.

3. The system of claim 2 wherein at least two of the electrodeionization devices are mounted end-to-end.

4. The system of claim 1 wherein the first plate edge is substantially parallel to a longitudinal axis of the first electrodeionization device.

5. The system of claim 1 further comprising a fastener for joining the first bracket to the second bracket via the first plate edge.

6. The system of claim 1 wherein the first plate edge is substantially normal to a longitudinal axis of the first electrodeionization device.

7. The system of claim 1 wherein the first bracket further comprises a second plate edge constructed and arranged to be fastened to a second plate edge on the second bracket.

8. The system of claim 1 wherein the plate of the first bracket defines a passageway constructed and arranged to receive at least one electrical conduit.

9. The system of claim 1 wherein the plate of the first bracket defines at least one fluid passageway.

10. An electrodeionization device comprising:
a housing comprising a first end and a second ends;
a first bracket attached to the first end, wherein the first bracket comprises; a plate defining a receiving section shaped to conform with a shape of a portion of the housing and constructed and arranged to support a weight of the electrodeionization device: and a first plate edge positioned on at least one of an outer periphery and a face opposite the receiving section constructed and arranged to be fastened to another plate edge; and
a second bracket attached to the second end, wherein the second bracket comprises: a plate defining a receiving section shaped to conform with a shape of a portion housing and constructed and arranged to support a weight of the first electrodeionization device;
and a first plate edge positioned on at least one of an outer periphery and a face opposite the receiving section constructed and arranged to be fastened to another plate edge,
wherein the first bracket and second bracket each support a weight of a second electrodeionization device.

11. The electrodeionization device of claim 10 wherein the brackets supply the sole structural support for the weight of the second electrodeionization device.

12. The electrodeionization device of claim 10 wherein the first plate edge of the first bracket is substantially parallel to a longitudinal axis of the first electrodeionization device.

13. The electrodeionization device of claim 10 further comprising a fastener for joining the first bracket to the second bracket via the first plate edge of the first bracket.

14. The electrodeionization device of claim 10 wherein the first plate edge of the first bracket is substantially normal to a longitudinal axis of the first electrodeionization device.

15. The electrodeionization device of claim 10 wherein the first bracket further comprises a second plate edge constructed and arranged to be fastened to a second plate edge on the second bracket.

16. The electrodeionization device of claim 10 wherein the plate of the first bracket defines a passageway constructed and arranged to receive at least one electrical conduit.

17. The electrodelonization device of claim 10 wherein the plate of the first bracket defines at least one fluid passageway.

18. An electrodeionization system comprising:
first and second electrodeionization devices; and
two brackets, wherein the two brackets each comprise: a plate defining a receiving section shaped to conform with a shape of a portion of an electrodeionization device and constructed and arranged to support a weight of an electrodeionization device; and a first plate edge positioned on at least one of an outer periphery and a face opposite the receiving section constructed and arranged to be fastened to another plate edge, and
wherein the first and second electrodeionization devices are in fluid communication via the two brackets.

19. The system of claim 18 absent any piping that is external the electrodeionization devices and the two brackets.

20. The system of claim 18 wherein the plate of each bracket defines at least one fluid passageway.

21. A method of supporting an electrodeionization device comprising:
providing a first electrodeionization device including a housing, the housing attached to a first bracket at one end of the housing and a second bracket at an opposite end of the housing;
providing a second electrodeionization device including a housing attached to a third bracket one end of the housing and a fourth bracket at an opposite end of the housing;
positioning the second electrodeionization device above the first electrodeionization device; and
fastening the first bracket to the third bracket and the second bracket to the fourth bracket wherein a weight of the first electrodeionization device and a weight of the second electrodeionization device are substantially supported by the first and second brackets.

22. The method of claim 21 further comprising attaching a third electrodeionization device to the second electrodeionization device by fastening the third and fourth brackets to a fifth and sixth bracket that are attached to the third electrodeionization device wherein a weight of the third electrodeionization device is substantially supported by the first and second brackets.

23. The method of claim 21 wherein the housings are attached to their associated brackets before the brackets are fastened to one another.

24. A method of supporting an electrodeionization device comprising:
providing a first electrodeionization device including a housing, the housing attached to a first bracket at one end of the housing and a second bracket at an opposite end of the housing;
providing a second electrodeionization device including a housing attached to a third bracket at one end of the housing and a fourth bracket at an opposite end of the housing; and
fastening the first bracket to the third bracket end-to-end to align the first and second electrodeionization devices along a common longitudinal axis,
wherein a weight of the first electrodeionization device is transferred to a base by at least one of the first and second brackets.

25. The method of claim 24 further comprising attaching a third electrodeionization device to the second electrodeionization device by fastening the third and fourth brackets to a fifth and sixth bracket that are attached to the third electrodeionization device wherein the weight of the third electrodeionization device is substantially supported by the third and fourth brackets.

* * * * *